(12) United States Patent
Englebert et al.

(10) Patent No.: US 12,043,349 B2
(45) Date of Patent: Jul. 23, 2024

(54) LIQUEFIED GAS TRANSFER SYSTEM

(71) Applicant: Gaztransport Et Technigaz, Saint Remy les Chevreuse (FR)

(72) Inventors: Patrick Englebert, Saint Remy les Chevreuse (FR); Guillaume Gelin, Saint Remy les Chevreuse (FR)

(73) Assignee: Gaztransport Et Technigaz, Saint Remy les Chevreuse (FR)

( * ) Notice: Subject to any disclaimer, the term of this patent is extended or adjusted under 35 U.S.C. 154(b) by 313 days.

(21) Appl. No.: 17/259,899

(22) PCT Filed: Jul. 9, 2019

(86) PCT No.: PCT/FR2019/051711
§ 371 (c)(1),
(2) Date: Jan. 12, 2021

(87) PCT Pub. No.: WO2020/012114
PCT Pub. Date: Jan. 16, 2020

(65) Prior Publication Data
US 2021/0291940 A1    Sep. 23, 2021

(30) Foreign Application Priority Data

Jul. 12, 2018 (FR) ..................... 1856451

(51) Int. Cl.
*B63B 27/34* (2006.01)
*B63B 27/24* (2006.01)
(Continued)

(52) U.S. Cl.
CPC .............. *B63B 27/34* (2013.01); *B63B 27/24* (2013.01); *B65G 67/606* (2013.01); *B67D 9/02* (2013.01); *F16L 59/141* (2013.01)

(58) Field of Classification Search
CPC .. B67D 9/00; B67D 7/002; B67D 9/02; B63B 27/34; B63B 27/24; Y10T 137/8807; B65G 67/606; F16L 59/141
See application file for complete search history.

(56) References Cited

U.S. PATENT DOCUMENTS 3,085,593 A * 4/1963 Sorensen ................. F16L 27/08
74/471 R
3,535,883 A * 10/1970 Manning ............... B63B 22/021
137/236.1
(Continued)

FOREIGN PATENT DOCUMENTS

GB    2537673 A    10/2016
JP    62-501643    7/1987
(Continued)

*Primary Examiner* — Gregory W Adams
(74) *Attorney, Agent, or Firm* — Blank Rome LLP (57) ABSTRACT

The invention relates to a system (1) for transferring liquefied gas between a first facility and a second facility, said transfer system (1) including:
an articulated arm (2) including a first proximal part (6) suitable for being mounted so that it can rotate on the first facility about a first vertical axis (A), a second median part (7) that is mounted pivoting on the first proximal part (6) and a third distal part (8) that is mounted pivoting on the second median part (7); and
at least one transfer line (3, 4, 5), suitable for transferring liquefied gas between the first facility and the second facility, and including a flexible first proximal portion (15) suitable for being connected to a liquefied gas storage tank of the first facility; a rigid second median portion (16) that is fastened to the second median part (7) of the articulated arm (2) and a third distal portion (17) that is suspended on the third distal part (8) of the articulated arm (2) and has an end suitable for being
(Continued)

connected to a manifold of the second facility, the second median portion (16) being provided with a valve (22).

21 Claims, 4 Drawing Sheets

(51) Int. Cl.
  *B65G 67/60* (2006.01)
  *B67D 9/02* (2010.01)
  *F16L 59/14* (2006.01)

(56) References Cited

U.S. PATENT DOCUMENTS

| | | | | |
|---|---|---|---|---|
| 3,620,268 | A * | 11/1971 | Thorpe Willoughby | B67D 9/02 141/279 |
| 3,675,680 | A * | 7/1972 | Frohlich | B67D 9/02 141/378 |
| 4,262,696 | A * | 4/1981 | Oury | E04G 21/04 141/232 |
| 4,957,147 | A * | 9/1990 | Lowe | B67C 3/30 141/250 |
| 6,220,292 | B1 * | 4/2001 | Woodling | B66C 23/42 137/355.16 |
| 6,367,522 | B1 * | 4/2002 | Tyer | B63B 27/24 114/230.1 |
| 6,609,544 | B1 * | 8/2003 | Williamson | B63B 27/24 114/230.1 |
| 6,871,732 | B2 * | 3/2005 | Flint | H02G 11/00 361/826 |
| 8,286,678 | B2 * | 10/2012 | Adkins | B63B 27/34 114/230.15 |
| 8,967,174 | B1 * | 3/2015 | Perreault | B63B 27/30 414/138.2 |
| 10,399,643 | B2 * | 9/2019 | Unno | F16L 59/065 |
| 2010/0236661 | A1 * | 9/2010 | Gibisch | B67D 7/78 141/279 |
| 2014/0034137 | A1 * | 2/2014 | Kelly | F16L 3/16 137/356 |
| 2014/0290779 | A1 * | 10/2014 | Boudoin | B63B 35/28 137/899.2 |
| 2015/0090339 | A1 * | 4/2015 | Spexarth | F16L 1/19 137/1 |
| 2015/0261089 | A1 * | 9/2015 | Zhou | G03F 7/16 222/190 |
| 2016/0251062 | A1 * | 9/2016 | Gelin | B63B 27/34 141/1 |
| 2016/0304168 | A1 | 10/2016 | Fusy | |
| 2017/0057806 | A1 * | 3/2017 | Perdrix | B63B 27/34 |
| 2017/0096195 | A1 * | 4/2017 | Gelin | B63B 22/00 |
| 2017/0253302 | A1 * | 9/2017 | Hellesmark | B67D 9/00 |

FOREIGN PATENT DOCUMENTS

| | | |
|---|---|---|
| JP | 2016-070377 A | 5/2016 |
| JP | 2017-510495 A | 4/2017 |
| WO | 86/03819 A1 | 7/1986 |
| WO | WO2016170304 | 10/2016 |

\* cited by examiner

LIQUEFIED GAS TRANSFER SYSTEM

RELATED APPLICATIONS

The present application is a U.S. National Stage of International Application No. PCT/FR2019/051711, filed Jul. 9, 2019, which claims priority to French Patent Application No. 1856451, filed Jul. 12, 2018, both of which is incorporated herein by reference.

TECHNICAL FIELD

The invention relates to the field of fluid transfer and more particularly to the transfer of liquefied gas between two remote facilities, such as a supplier vessel and a client vessel, for example.

TECHNOLOGICAL BACKGROUND

There is a wide variety of systems in the prior art for transferring liquefied gas, at sea, between two vessels.

WO2016170304 discloses a liquefied natural gas transfer system including an articulated arm in three parts mounted articulated in relation to each other. The articulated arm includes a proximal part that is mounted pivoting about a vertical axis on the deck of a supplier vessel, a median part that is mounted articulated on the proximal part about a first horizontal axis and a distal part that is mounted articulated on the median part about a second horizontal axis. The articulated arm includes two linear actuators, one being mounted articulated on the proximal part and on the median part and the other being mounted articulated on the median part and on the distal part.

The transfer system also includes two transfer lines, one of which is used for transferring liquefied gas from the supplier vessel to the client vessel and the other of which is used for extracting natural gas from the client vessel to the supplier vessel in order to balance the pressures in the expansion spaces of the tanks of the two vessels. Each transfer line includes a rigid first portion that extends along the proximal part of the arm and a flexible second portion that is suspended by means of a lifting device at the end of the distal part of the articulated arm and is suitable for being connected to a manifold on the client vessel. The flexible second portions are each provided with an emergency release coupling. Each emergency release coupling includes two parts that are capable of disconnecting from each other in order to interrupt the transfer of liquefied gas between the supplier vessel and the client vessel.

Such a transfer system is not entirely satisfactory. In particular, such a transfer system does not envisage a valve held by the articulated arm and arranged upstream of the emergency release couplings so that it isolates the flexible second portion from the rest of the transfer line when the flexible second portion is disconnected from the manifold on the client vessel. With such a transfer system, if a valve is arranged upstream of the couplings in order to provide a satisfactory level of safety, it is necessarily arranged on the deck of the supplier vessel, i.e. at a significant distance, along the transfer line, from the end of the flexible second portion. As a result, in the event of disconnection, a significant quantity of liquefied gas is trapped in a buffer zone extending between the valve and the end of the flexible second portion. Such a buffer zone must be fully drained and rendered inert in order to ensure the complete absence of gas after each transfer operation, which results in a significant disconnection time after transfer.

SUMMARY

One idea behind the invention is to propose a fluid transfer system that is simple and reliable, makes it possible to adapt to a wide variety of configurations and makes it possible to limit the length of the buffer portion of the transfer line that must be drained after the transfer operations.

According to one embodiment, the invention provides a system for transferring liquefied gas between a first facility and a second facility, said transfer system including:
- an articulated arm including a first proximal part suitable for being mounted so that it can rotate on the first facility about a first vertical axis, a second median part that is mounted pivoting on the first proximal part about a second axis and a third distal part that is mounted pivoting on the second median part about a third axis; and
- at least one transfer line, suitable for transferring liquefied gas between the first facility and the second facility, and including a flexible first proximal portion suitable for being connected to a liquefied gas storage tank of the first facility; a rigid second median portion that is fastened to the second median part of the articulated arm and a third distal portion that is suspended on the third distal part of the articulated arm and has an end suitable for being connected to a manifold of the second facility, the second median portion being provided with a valve.

Due it its aforementioned three-part structure, such an articulated arm thus makes it possible to adapt to a wide variety of different configurations.

Moreover, as the first proximal portion and the third distal portion of the transfer line are flexible, they permit the relative movements of the three parts of the articulated arm, without having to use rotating joints, which are costly and complex and can generate sealing defects.

In addition, as the transfer line includes a valve supported by the articulated arm, the quantity of liquefied gas trapped between the end of the third distal portion and the valve is limited. Moreover, the quantity of liquefied gas that can be trapped between the valve and the end of the third distal portion is all the more limited in that the valve is mounted on the second median portion of the transfer line, which is fastened to the second median part of the articulated arm.

Finally, in such an arrangement, as the valve is not held by the flexible third distal portion, it does not increase the difficulty of maneuvering said third distal portion, so that the operations to connect the transfer line to the manifold of the second facility are not negatively affected by the supporting of the valve by the articulated arm.

According to other advantageous embodiments, such a transfer system can have one or more of the following features.

According to one embodiment, the second axis is horizontal.

According to one embodiment, the third axis is horizontal.

According to one embodiment, the second median portion includes a first end and a second end respectively connected to the first proximal portion and to the third distal portion and the valve is arranged closer to the second end of the second median portion than to the first end thereof. This makes it possible to further reduce the quantity of gas trapped between the valve and the end of the third distal portion.

According to one embodiment, the second median portion extends along the second median part of the articulated arm.

According to one embodiment, the second median portion has a bent end oriented downwards and connected to the first proximal portion. According to one embodiment, the second median portion has a bent end oriented downwards and connected to the third distal portion. This makes it possible to limit the stresses exerted on the first proximal portion and the third distal portion.

According to one embodiment, one of the ends of the second median portion is aligned or substantially aligned with the second axis of articulation. According to one embodiment, one of the ends of the second median portion is aligned or substantially aligned with the third axis of articulation. According to one embodiment, two ends of the second median portion are respectively aligned with the second axis of articulation and the third axis of articulation. This makes it possible to limit the length of the first proximal portion and the third distal portion of the transfer line.

According to one embodiment, the second median portion is laterally offset relative to the second median part of the articulated arm. This is advantageous to allow the incorporation of the valve when it has a significant height.

According to one embodiment, the second median portion is fastened to the second median part of the articulated arm by means of support members that are distributed along the second median part.

According to one embodiment, the support members include cross members fastened to the second median part and a clamping collar fastened to said cross members and through which the second median portion passes.

According to one embodiment, the support members further include an insulating sleeve interposed radially between the clamping collar and the second median part.

According to one embodiment, the first proximal portion rests on a support covered with a non-stick coating. This makes it possible in particular to limit the frictional wear of the first proximal portion.

According to one embodiment, the non-stick coating of the support is polytetrafluoroethylene.

According to one embodiment, the first proximal part of the articulated arm includes a protective cylindrical skirt including a non-stick coating. This also makes it possible to limit the frictional wear of the first proximal part.

According to one embodiment, the non-stick coating of the protective cylindrical skirt is polytetrafluoroethylene.

According to one embodiment, the third distal portion is suspended on the third distal part of the articulated arm by means of a lifting device, the lifting device including a drum that is fastened to the third distal part of the arm and is associated with a motor and a cable that is wound around said drum and fastened to the third distal portion.

According to one embodiment, the lifting device includes a pulley that is arranged at one end of the third distal part and guides said cable.

According to one embodiment, the drum and the associated motor are positioned closer to the third axis than to the pulley.

According to one embodiment, the cable is fastened to the third distal portion by means of a load balancing spreader.

According to one embodiment, the third distal portion is provided with an emergency release coupling.

According to one embodiment, the emergency release coupling is hung on the load balancing spreader.

According to one embodiment, the emergency release coupling is arranged at the junction between the third distal portion and the second median portion.

According to one embodiment, the transfer system includes at least two transfer lines, the first proximal portions of each of the two transfer lines being respectively arranged laterally on either side of the first proximal part of the articulated arm and the second median portions of each of the two transfer lines being respectively arranged laterally on either side of the second median part of the articulated arm.

According to one embodiment, the transfer system includes three transfer lines, the first proximal portions of two of the three transfer lines and the third proximal part of the other of the three transfer lines being respectively arranged on either side of the first proximal part of the articulated arm, the second median portions of two of the three transfer lines and the second median portion of the other of the three transfer lines being respectively arranged on either side of the second median part of the articulated arm.

According to one embodiment, the second median portion includes a double-walled hose having an intermediate space that is lined with an insulating material.

According to one embodiment, the first proximal portion and the third distal portion each include a composite hose or a corrugated double-walled hose that includes an intermediate space lined with an insulating material.

According to one embodiment, the transfer system includes a protective sleeve that is fastened to one end of the second median portion, which is connected to the first proximal portion, the protective sleeve accommodating one end of the first proximal portion and having a flared inner surface so that it ensures a minimum radius of curvature for said end of the first proximal portion.

According to one embodiment, the transfer system includes a protective sleeve that is fastened to one end of the second median portion, which is connected to the third distal portion, the protective sleeve accommodating one end of the first proximal portion and having a flared inner surface so that it ensures a minimum radius of curvature for said end of the third distal portion.

According to one embodiment, the transfer system includes at least two transfer lines and a bypass device that connects the median portion of the two transfer lines upstream of the valve provided on each of the median portions.

According to one embodiment, the transfer system includes an actuation device enabling that makes it possible to extend the articulated arm.

According to one embodiment, the actuation device includes a motor configured to pivot the first proximal part about the first axis.

According to one embodiment, the actuation device includes a first linear actuator having a first end mounted articulated on the first proximal part and a second end mounted articulated on the second median part and a second linear actuator having a first end mounted articulated on the second median part and a second end mounted articulated on the third distal part.

According to one embodiment, the invention provides a vessel provided with the aforementioned transfer system.

According to one embodiment, the articulated arm has a rest position and the articulated arm extends, in said rest position, parallel to the longitudinal direction of the vessel.

BRIEF DESCRIPTION OF THE FIGURES

The invention will be more clearly understood, and further aims, features and advantages thereof will become more apparent from the following description of several specific embodiments of the invention, given by way of non-limiting illustration only, with reference to the attached drawings.

DETAILED DESCRIPTION OF THE EMBODIMENTS

A transfer system 1 that makes it possible to transfer liquefied gas, such as liquefied natural gas (LNG), between two remote facilities, such as a supplier vessel and a client vessel, will be described below. The supplier vessel is for example a bunker vessel charged with replenishing other vessels with LNG, and the client vessel is an LNG-propelled vessel.

With reference to FIGS. 1 to 6, it can be seen that the transfer system 1 includes an articulated arm 2 suitable for being mounted articulated on the deck 30 of the supplier vessel 31 and a plurality of transfer lines 3, 4, 5.

In the embodiment shown, the transfer system 1 includes three transfer lines 3, 4, 5. A first transfer line and a second transfer line 3, 4, 5 are suitable for being connected to a liquefied natural gas storage tank, not shown, on the supplier vessel and to a receiving manifold on the client vessel, not shown, and are used for transferring liquefied natural gas from the supplier vessel 31 to the client vessel. The third transfer line 5 is also suitable for being connected to a receiving manifold of the client vessel but is used for extracting natural gas in the gaseous state from a tank on the client vessel to the supplier vessel in order to balance the pressures in the expansion spaces of the tanks of the two vessels. According to one embodiment, the third transfer line 5 is connected to a gas reliquefaction facility, on board the supplier vessel.

In order to generate the pressure necessary to transfer the liquefied natural gas, pumps, not shown, on board the supplier vessel and/or pumps on board the client vessel are advantageously implemented.

The articulated arm 2 includes three parts mounted articulated relative to each other, namely a first proximal part 6, a second median part 7 and a third distal part 8. The first proximal part 6 is mounted pivoting about a vertical axis A on the deck of the supplier vessel, the second median part 7 is mounted pivoting about a horizontal axis B on the first proximal part 6 and the third distal part 8 is mounted pivoting about a horizontal axis C on the second median part 7.

Figure 1:
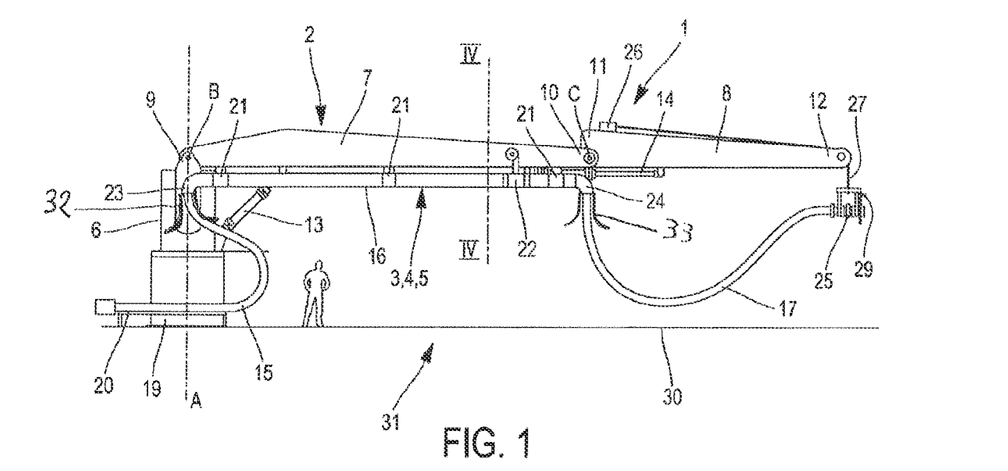
FIG. 1 is a side view of a system for transferring a liquefied gas, according to one embodiment, in a rest position.
Figure 2:
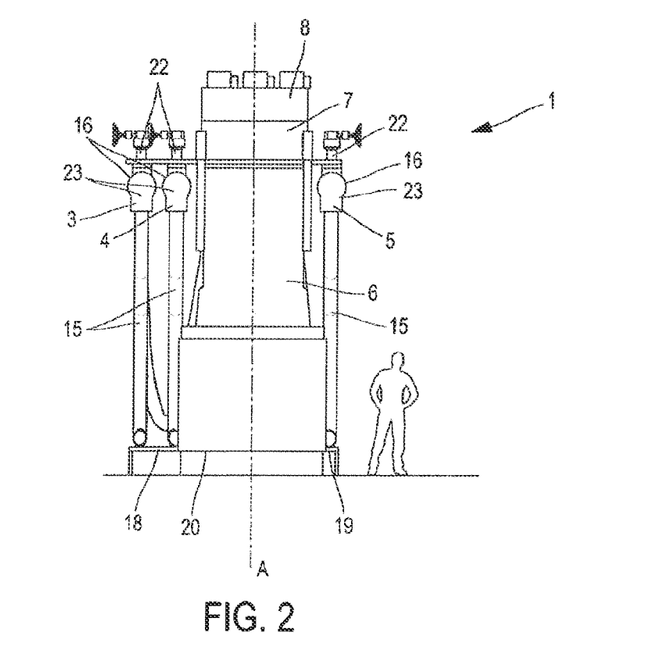
FIG. 2 is a rear view of the liquefied gas transfer system in FIG. 1.

In the embodiment shown, the first proximal part 6 is a cylindrical turret that is mounted pivoting about the vertical axis A and can pivot in one direction or the other from the rest position, illustrated in FIGS. 1 and 2. In one embodiment, in the rest position, the articulated arm extends in a longitudinal plane that is oriented parallel to the longitudinal direction of the supplier vessel. The cylindrical turret is for example capable of pivoting 90° in each of the two pivoting directions relative to the rest position illustrated in FIGS. 1 and 2. The transfer system 1 is thus capable of transferring liquefied gas to the client vessel regardless of which side of the supplier vessel 31 it is on.

The second median part 7 and the third distal part 8 each take the form of a beam. The second median part 7 is articulated, at its rear end 9, on the first proximal part 6, and at its front end 10, on the rear end 11 of the third distal part 8.

Furthermore, in order to allow the articulated arm 2 to extend, it is provided with an actuation device. The actuation device includes a motor, not illustrated, that makes it possible to pivot the first proximal part 6. The actuation device further includes two linear actuators 13, 14, visible in FIGS. 1 and 6, such as hydraulic or pneumatic cylinders. The first linear actuator 13 has a first end mounted articulated on the first proximal part 6 and a second end mounted articulated on the second median part 7 and thus makes it possible to control the rotation of the second median part 7 relative to the first proximal part 6. The second linear actuator 14 has a first end mounted articulated on the second median part 7 and a second end mounted articulated on the third distal part 8 and thus makes it possible to control the rotation of the third distal part 8 relative to the second median part 7.

Figure 5:
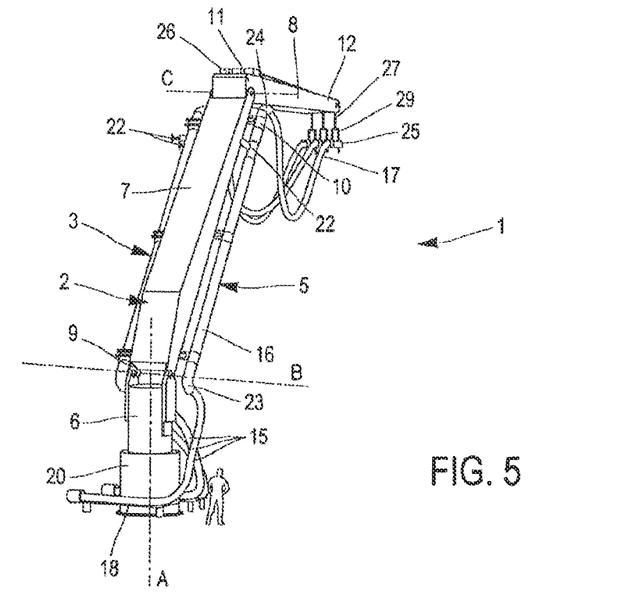
FIGS. 5 and 6 illustrate the transfer system in an extended operating position.
Figure 6:
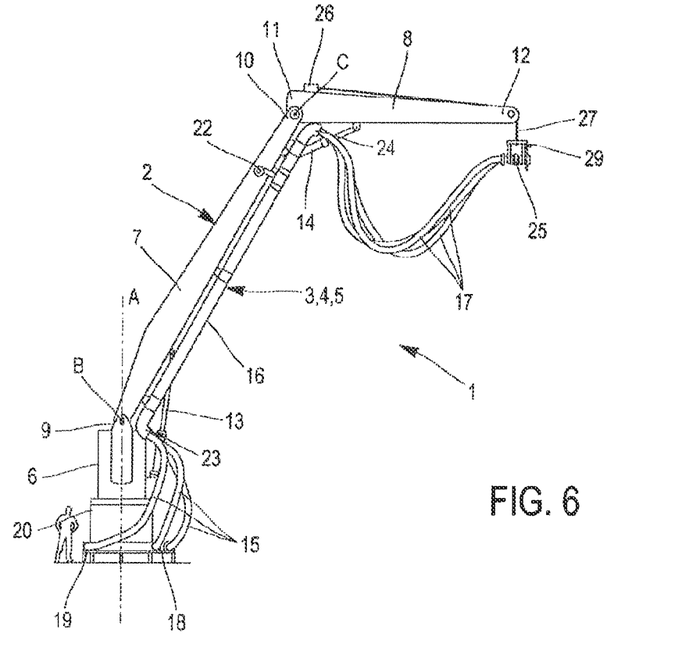
Figure 7:
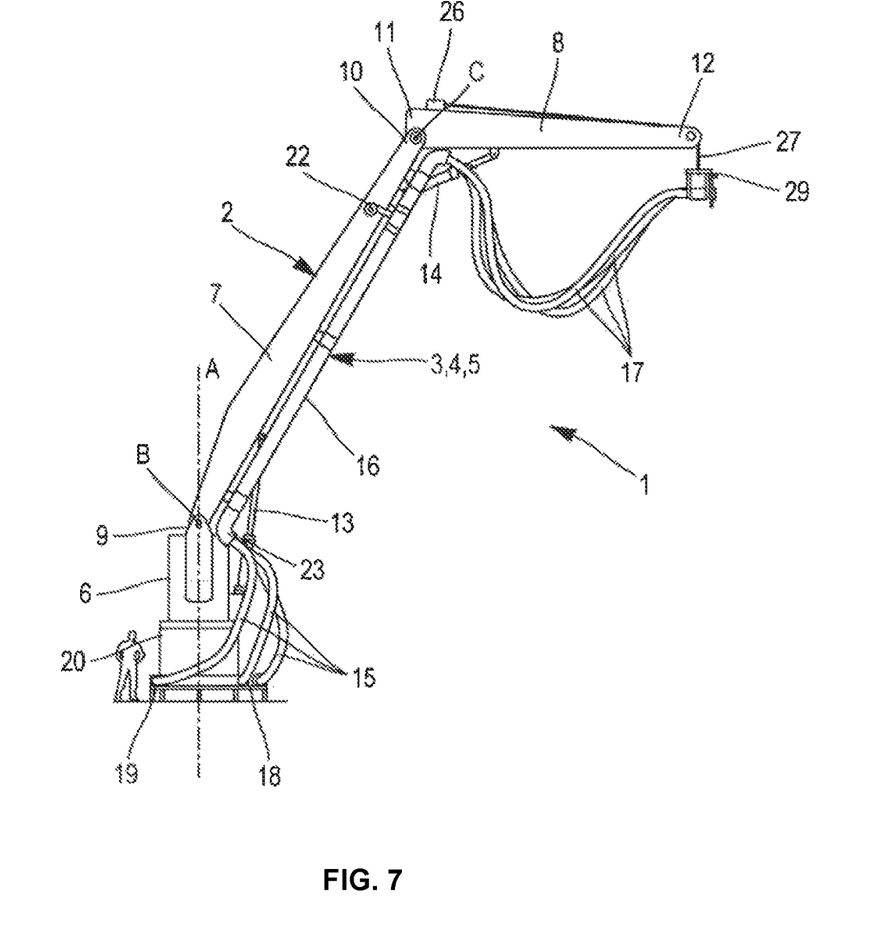
FIG. 7 illustrates the transfer system according to a second embodiment in which an emergency release coupling is arranged at the junction between the second median portion and the third distal portion.

As shown in FIG. 1, when the articulated arm 2 is in its rest position, the second median part 7 and the third distal part 8 extend continuing on from each other, substantially horizontally. In this rest position, the first linear actuator 13 is in a retracted position while the second linear actuator 14 is in an extended position. In order to move the articulated arm 2 from its rest position, illustrated in FIG. 1, to an extended position, as shown in FIGS. 5 and 6, the first actuator 13 is capable of extending so that it pivots the second median part 7 relative to the first proximal part 6 in a first rotation direction so as to raise the front end 10 of the second median part 7. Furthermore, the second actuator 14 is capable of retracting so that it pivots the third distal portion 8 relative to the second median part 7 in a second rotation direction opposite to the first rotation direction.

Such a three-part articulated arm 2 thus makes it possible for the transfer system 1 to adapt to a wide variety of different configurations.

Furthermore, each of the three transfer lines 3, 4, 5 includes in succession a flexible first proximal portion 15, a rigid second median portion 16, which is fastened to the second median part 7 of the articulated arm 2, and a flexible third distal portion 17.

The flexible portions, namely the first proximal portion 15 and the third distal portion 17, consist of cryogenic hoses, such as composite hoses or corrugated double-walled hoses, for example made from stainless steel, the intermediate space of which is lined with an insulating material.

As the first proximal portions 15 of the transfer lines 3, 4, 5 are flexible, they permit the rotation of the first proximal part 6 relative to the deck 30 of the supplier vessel 31 about the vertical axis A and the rotation of the second median part 7 of the articulated arm 2 relative to the first proximal part 6 about the horizontal axis B.

Figure 3:
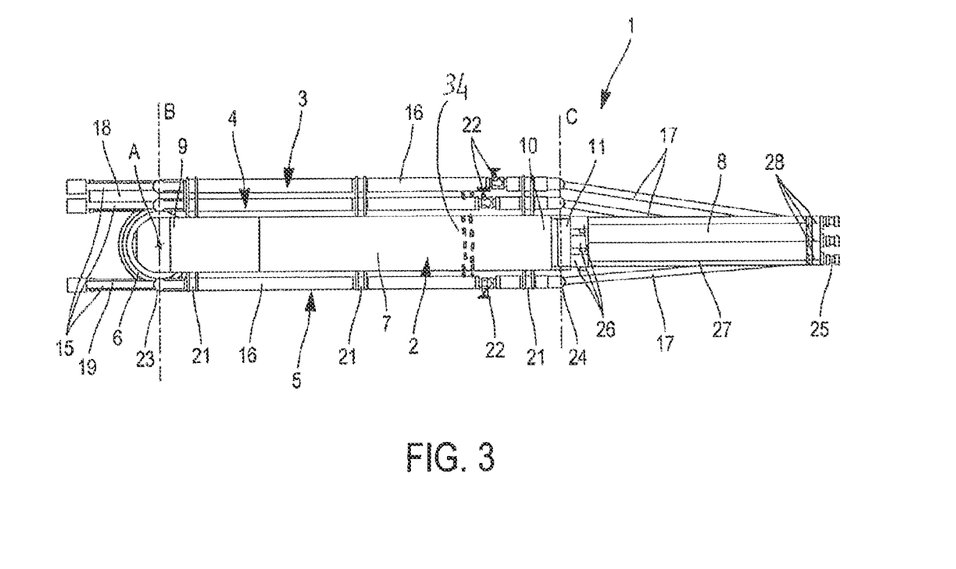
FIG. 3 is a top view of the liquefied gas transfer system in FIG. 1.

The first proximal portions 15 of the transfer lines 3, 4, 5 are distributed on either side of the first proximal part 6 of the articulated arm 2. In particular, as shown in FIG. 3, the first proximal portion 15 of the first and second transfer lines 3, 4, and the first proximal portion of the third transfer line 5, are arranged diametrically on either side of the first proximal part 6 of the articulated arm 2.

The transfer system 1 includes two planar supports 18, 19 that are respectively arranged to support the first proximal portion 15 of the first and second transfer lines 3, 4 and the first proximal portion of the third transfer line 5. Advantageously, the supports 18, 19 are covered with a non-stick coating, which makes it possible to reduce the friction that might occur between said supports 18, 19 and the first proximal portions 15 of the transfer lines 3, 4, 5 when the articulated arm 2 is moved, and particularly when the first proximal part 6 of the articulated arm 2 pivots about its vertical pivot axis A. This makes it possible to limit the frictional wear of the first proximal portions 15 and to limit the forces necessary to pivot the first proximal part 6 of the articulated arm 2. The non-stick coating is for example polytetrafluoroethylene (PTFE).

Furthermore, advantageously, the first proximal part 6 includes, at least in a lower portion that might come into contact with the first proximal portions 15 during the movement of the first proximal part 6 about the vertical axis A, a protective cylindrical skirt 20. The protective cylindrical skirt 20 includes a non-stick coating, such as polytetrafluoroethylene (PTFE). This makes it possible to limit the friction that might occur between the first proximal part 6 of the articulated arm 2 and the first proximal portions 15 of the transfer lines 3, 4, 5.

Advantageously, as shown in FIG. 1, in order to limit the stresses acting on the first proximal portions 15 when the articulated arm 2 is in the rest position, the first proximal portions 15 are, in said rest position, substantially arranged in the same vertical plane as the second median portion 16 of their respective transfer line 3, 4, 5.

The second median portion 16 of the transfer lines 3, 4, 5 is rigid and consists of a cryogenic hose, such as a double-walled hose, for example made from stainless steel, the intermediate space of which is lined with an insulating material.

The second median portions 16 extend along the second median part 7 of the articulated arm 2, parallel to the longitudinal direction thereof. The second median portions 16 are arranged on one side or the other of the second median part 7 of the articulated arm 2. Thus, as shown in FIG. 3, the second median portion 16 of the first and second transfer lines 3, 4, and the second median portion of the third transfer line 5, are arranged laterally on either side of the second median part 7 of the articulated arm 2.

The second median portions 16 are fastened to the articulated arm 2 by means of support members 21 that are evenly distributed along said second median portions 16. According to one embodiment, the support members 21 include cross members that are welded to the second median part 7 of the articulated arm 2 and a clamping collar that is fastened to said cross members and through which the second median portion 16 passes. Advantageously, the support members 21 also include an insulating sleeve interposed radially between the clamping collar and the second median portion 16.

The second median portions 16 are also provided with cryogenic valves 22. The valves 22 are advantageously arranged near the front end of the second median portion 16, i.e., the end of the second median portion 16 that is connected to the third distal portion 17. This makes it possible to limit the quantity of liquefied gas downstream of said valves 22 when the transfer lines 3, 4, 5 are disconnected from the receiving manifold on the client vessel. The valves 22 are also advantageously arranged closer to the front end 24 of the second median portion 16 than to the rear end 23.

Figure 4:
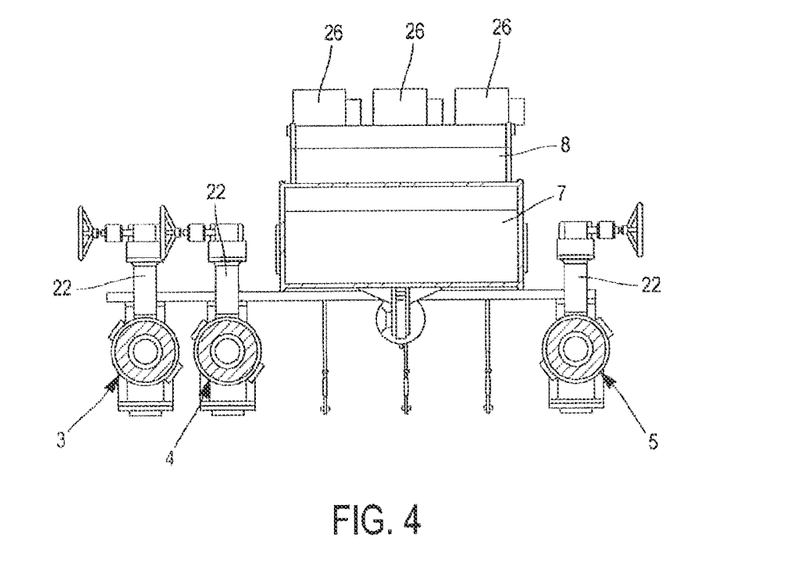
FIG. 4 is a cross-sectional view along the line IV-IV in FIG. 1.

It will further be noted that, as shown for example in FIG. 4, the valves 22 have a significant height. As a result of this, in order to allow easy incorporation of said valves 22, the second median portions 16 are laterally offset relative to the second median part 7 of the articulated arm 2.

Furthermore, the second ends 23, 24 of each second median portion 16 are bent, for example at 90°, and are oriented downwards. This makes it possible to avoid the radius of curvature of the first proximal portions 15 and the third distal portions 17 being too small at the end thereof connected to the second median portion 16. The stresses that might be exerted on the first proximal portions 15 and the third distal portions 17 are thus limited.

Advantageously, the rear end 23 of each second median portion 16 is aligned or substantially aligned with the axis of articulation B of the second median part 7 relative to the first proximal part 6 of the articulated arm 2. Likewise, the front end 24 of each second median portion 16 is advantageously aligned or substantially aligned with the axis of articulation C of the third distal part 8 relative to the second median part 7 of the articulated arm 2. This makes it possible to limit the length of the first proximal portion 15 and the third distal portion 8 of the transfer lines 3, 4, 5 and to limit the fatigue wear thereof.

Moreover, according to an advantageous embodiment, as shown schematically in FIG. 1, the transfer system 1 includes protective sleeves 32, 33 that are fastened to the rear end 23 and the front end 24 of each median portion 16. The front end of the first proximal portion 15 is accommodated in the protective sleeve 32 and the rear end of the third distal portion 17 is accommodated in the protective sleeve 33. The protective sleeves 32,33 have an arc-shaped inner surface that flares towards the bottom and is thus tulip-shaped. The radius of curvature of the arc-shaped inner surface is greater than the minimum permissible radius of curvature of the first proximal portion 15 and the third distal portion 17. The protective sleeves 32, 33 thus make it possible to further protect the first proximal portion 15 and the third distal portion 17.

Furthermore, the third distal portion 8 of each transfer line 3, 4, 5 includes, at its free end, a coupling 25 suitable for being connected to a manifold on the client vessel, during a transfer operation.

According to one embodiment, the coupling 25 is an emergency release coupling, also known as an ERC. The emergency release coupling includes an upstream element and a downstream element that are connected to each other in a sealed manner in an operating position and are capable of separating from each other in an emergency. Advantageously, each of the upstream and downstream elements is provided with a check valve that makes it possible to prevent the flow of the fluid through said upstream or downstream element when the upstream and downstream elements are disconnected from each other. According to one embodiment, the release of the emergency release coupling is controlled by means of a hydraulic or pneumatic circuit capable of being remotely controlled. According to one embodiment, the upstream and downstream elements are secured to each other by means of a fastening member designed to fail when a separating force greater than a given threshold is exerted on the emergency release coupling.

According to another embodiment, not shown, the transfer system 1 includes in addition to the coupling 25 arranged at the free end of each of the three distal portions 17, an emergency release coupling that is positioned at the rear end of the third distal portion 17, i.e., at the end that is connected to the second median portion 16.

Furthermore, the third distal portion 17 of each transfer line 3, 4, 5 is suspended at the front end 12 of the third distal part 8 of the articulated arm 2. To this end, each of the couplings 25 is fastened to a lifting device. Each lifting device includes a drum 26 that is fastened to the third distal part 8 of the articulated arm 2 and interacts with a motor that makes it possible to rotate said drum 26 and a cable 27 that is wound around said drum 26 and fastened to one of the couplings 25. In the embodiment shown, each cable 27 interacts with a pulley 28, shown in FIG. 3, arranged at the front end 12 of the third distal part 8 so that the third distal portion 17 of the transfer lines 3, 4, 5 is suspended at the front end 12 of the third distal part 8 even though the drum 26 of the lifting device is arranged at a distance from said front end 12. The drums 26 and the associated motors are thus advantageously arranged near the rear end 11 of the third distal part 8, which makes it possible to limit the moment generated by the weight of the drums 26 and the motors and thus makes it possible to limit the forces exerted on the second linear actuator 14.

In the advantageous embodiment shown, the cable 27 of each lifting device is connected to the respective coupling 25 by means of a load balancing spreader 29, shown in FIGS. 1, 5 and 6, that makes it possible to keep the coupling 25 substantially horizontal regardless of the tilt of the articulated arm 2.

In an advantageous embodiment, the transfer system 1 includes a bypass device 34, shown in dotted lines in FIG. 3, that makes it possible to connect the median portion 16 of the first, second and third transfer lines 3, 4, 5 upstream of the valves 22. Such a bypass device 34 makes it possible to facilitate the chilling of the first and second transfer lines 3, 4. The aim of such chilling is to create temperature and pressure conditions in the first and second transfer lines 3, 4 suitable for the transfer of liquefied natural gas. In order to achieve this chilling, liquefied gas is for example conveyed through the first and second transfer lines 3, 4, then passes through the bypass device 34 before returning to the tank on the supplier vessel 30, for example via the third transfer line 5.

Although the invention has been described with reference to several specific embodiments, it is obvious that it is in no way limited thereto and that it includes all technical equivalents of the means described and any combinations thereof if these fall within the scope of the invention.

The use of the verb "include" or "comprise" and its conjugated forms does not rule out the presence of elements or steps other than those set out in a claim.

In the claims, any reference sign between parentheses cannot be interpreted as limiting the claim.

The invention claimed is:

1. A system for transferring liquefied gas between a first facility and a second facility, said transfer system including:
    an articulated arm including a first proximal part suitable for being mounted so that it can rotate on the first facility about a first vertical axis, a second median part that is mounted pivoting on the first proximal part about a second axis and a third distal part that is mounted pivoting on the second median part about a third axis; and
    at least one transfer line, suitable for transferring liquefied gas between the first facility and the second facility, and including a flexible first proximal portion suitable for being connected to a liquefied gas storage tank of the first facility; a rigid second median portion that is fastened to the second median part of the articulated arm and a third distal portion that is suspended on the third distal part of the articulated arm and has an end suitable for being connected to a manifold of the second facility, the second median portion being provided with a valve, and the third distal portion being provided with an emergency release coupling.

2. The transfer system as claimed in claim 1, in which the second median portion extends along the second median part of the articulated arm and has two bent ends oriented downwards and connected respectively to the first proximal portion and the third distal portion.

3. A vessel provided with a transfer system as claimed in claim 2.

4. The transfer system as claimed in claim 1, in which the two ends of the second median portion are respectively oriented along an axis which is secant to the second axis of articulation and the third axis of articulation.

5. The transfer system as claimed in claim 1, in which the second median portion is laterally offset relative to the second median part of the articulated arm.

6. The transfer system as claimed in claim 1, in which the second median portion is fastened to the second median part of the articulated arm by means of support members that are distributed along the second median part, the support members including cross members fastened to the second median part and a clamping collar fastened to said cross members and through which the second median portion passes.

7. The transfer system as claimed in claim 1, in which the first proximal portion rests on a support covered with a non-stick coating.

8. The transfer system as claimed in claim 1, in which the first proximal part of the articulated arm includes a protective cylindrical skirt including a non-stick coating.

9. The transfer system as claimed in claim 1, in which the third distal portion is suspended on the third distal part of the articulated arm by means of a lifting device, the lifting device including a drum that is fastened to the third distal part of the articulated arm and is associated with a motor and a cable that is wound around said drum and fastened to the third distal portion.

10. The transfer system as claimed in claim 9, in which the cable is fastened to the third distal portion by means of a load distributing spreader.

11. The transfer system as claimed in claim 1, in which the emergency release coupling is hung on the load balancing spreader.

12. The transfer system as claimed in claim 1, in which the emergency release coupling is arranged at the junction between the third distal portion and the second median portion.

13. The transfer system as claimed in claim 1, including at least two transfer lines, the first proximal portions of each of the two transfer lines being respectively arranged laterally on either side of the first proximal part of the articulated arm and the second median portions of each of the two transfer lines being respectively arranged laterally on either side of the second median part of the articulated arm.

14. The transfer system as claimed in claim 1, in which the second median portion includes a double-walled hose having an intermediate space that is lined with an insulating material.

15. The transfer system as claimed in claim 1, in which the first proximal portion and the third distal portion each include a composite hose or a corrugated double-walled hose that includes an intermediate space lined with an insulating material.

16. The transfer system as claimed in claim 1, including a protective sleeve that is fastened to one end of the second median portion, which is connected to the first proximal portion, the protective sleeve accommodating one end of the first proximal portion and having a flared inner surface so that it ensures a minimum radius of curvature for said end of the first proximal portion.

17. The transfer system as claimed in claim 1, including a protective sleeve that is fastened to one end of the second median portion, which is connected to the third distal portion, the protective sleeve accommodating one end of the first proximal portion and having a flared inner surface so that it ensures a minimum radius of curvature for said end of the third distal portion.

18. The transfer system as claimed in claim 1, including at least two transfer lines and a bypass device that connects the median portion of the two transfer lines upstream of a valve provided on each of the median portions.

19. A vessel provided with a transfer system as claimed in claim 1.

20. A system for transferring liquefied gas between a first facility and a second facility, said transfer system including:
   an articulated arm including a first proximal part suitable for being mounted so that it can rotate on the first facility about a first vertical axis, a second median part that is mounted pivoting on the first proximal part about a second axis and a third distal part that is mounted pivoting on the second median part about a third axis; and
   at least two transfer lines suitable for transferring liquefied gas between the first facility and the second facility, and each transfer line including,
      a flexible first proximal portion suitable for being connected to a liquefied gas storage tank of the first facility,
      a rigid second median portion that is fastened to the second median part of the articulated arm, and
      a third distal portion that is suspended on the third distal part of the articulated arm and has an end suitable for being connected to a manifold of the second facility,
   wherein the transfer system includes a bypass device that connects the median portions of the two transfer lines upstream of a valve provided on each of the median portions.

21. A system for transferring liquefied gas between a first facility and a second facility, said transfer system including:
   an articulated arm including a first proximal part suitable for being mounted so that it can rotate on the first facility about a first vertical axis, a second median part that is mounted pivoting on the first proximal part about a second axis and a third distal part that is mounted pivoting on the second median part about a third axis; and
   at least one transfer line suitable for transferring liquefied gas between the first facility and the second facility, and including,
      a flexible first proximal portion suitable for being connected to a liquefied gas storage tank of the first facility,
      a rigid second median portion that is fastened to the second median part of the articulated arm, and
      a third distal portion that is suspended on the third distal part of the articulated arm and has an end suitable for being connected to a manifold of the second facility, the second median portion being provided with a valve,
   wherein the transfer system includes a protective sleeve that is fastened to one end of the second median portion, the protective sleeve accommodating one end of the first proximal portion that is connected to the said end of the second median portion to which the protective sleeve is fastened and having a flared inner surface so that it ensures a minimum radius of curvature for said end of the first proximal portion.

\* \* \* \* \*